(12) United States Patent
Tatum et al.

(10) Patent No.: US 7,281,861 B2
(45) Date of Patent: Oct. 16, 2007

(54) METHODS AND APPARATUS FOR OPTICAL COMPONENT IDENTIFICATION

(75) Inventors: Jim Tatum, Plano, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 73 days.

(21) Appl. No.: 11/085,434

(22) Filed: Mar. 21, 2005

(65) Prior Publication Data

US 2006/0045433 A1 Mar. 2, 2006

Related U.S. Application Data

(60) Provisional application No. 60/611,949, filed on Sep. 22, 2004, provisional application No. 60/605,781, filed on Aug. 31, 2004.

(51) Int. Cl.
*G02B 6/36* (2006.01)
(52) U.S. Cl. .......................................... 385/88; 385/92
(58) Field of Classification Search ............. 385/88–94
See application file for complete search history.

(56) References Cited

U.S. PATENT DOCUMENTS

| | | | | |
|---|---|---|---|---|
| 3,868,514 | A * | 2/1975 | Israelsson | 250/566 |
| 4,652,395 | A | 3/1987 | Marcina et al. | 252/301.35 |
| 4,695,697 | A * | 9/1987 | Kosa | 219/121.83 |
| 5,448,582 | A * | 9/1995 | Lawandy | 372/42 |
| 6,481,886 | B1 * | 11/2002 | Narendrnath et al. | 374/141 |
| 6,692,031 | B2 | 2/2004 | McGrew | 283/93 |
| 2006/0056765 | A1 * | 3/2006 | Hwang et al. | 385/39 |

FOREIGN PATENT DOCUMENTS

JP 361043709 A * 3/1986 ............. 385/90

OTHER PUBLICATIONS

U.S. Appl. No. 11/085,788, filed Mar. 21, 2005 entitled "Test Device for Identifying Optical Components."
Bruchez Jr. et al., "Semiconductor Nanocrystals as Fluorescent Biological Labels", Science Magazine, vol. 281, Sep. 25, 1998, pp. 2013-2015.
Chan et al., "Quantum Dot Bioconjugates for Ultrasensitive Nonisotopic Detection",Science Magazine, vol. 281, Sep. 25, 1998, pp. 2016-2018.
Michalet et al., "Properties of Fluorescent Semiconductor Nanocrystals and their Application to Biological Labeling", Single Molecules, vol. 2, 2001 pp. 261-276, no month.

* cited by examiner

*Primary Examiner*—Quyen P Leung
(74) *Attorney, Agent, or Firm*—Workman Nydegger

(57) ABSTRACT

Methods, apparatuses, and systems for obtaining identification information about fiber optic components and optical assemblies in a non-invasive manner. The present invention includes optical subassemblies ("OSAs"), and optical assemblies incorporating the OSAs where the OSAs comprise means, such as fluorescent material, for producing a fluorescent identification emission having a predetermined spectral signature that provides identification information describing the particular OSA, a component of the OSA, or the optical assembly. The present invention further includes methods for manufacturing fiber optic components to include fluorescent material providing identification information describing the fiber optic component.

17 Claims, 4 Drawing Sheets

METHODS AND APPARATUS FOR OPTICAL COMPONENT IDENTIFICATION

CROSS-REFERENCE TO RELATED APPLICATIONS

This application claims the benefit of U.S. Provisional Application No. 60/611,949 entitled "Laser Assembly with Manufacturer Identification" filed Sep. 22, 2004 and the benefit of U.S. Provisional Application No. 60/605,781 entitled "Laser With Digital Electronic Interface" filed Aug. 31, 2004, the contents of both applications are hereby incorporated by reference.

BACKGROUND OF THE INVENTION

1. The Field of the Invention

The present invention relates to optical components in a fiber optic communication system. More particularly, the invention relates to methods, apparatuses and systems for providing identification of fiber optic components.

2. The Relevant Technology

Fiber optic technology is increasingly employed in the binary transmission of data over communication networks. Networks employing fiber optic technology are known as optical communication networks, and are typically characterized by high bandwidth and reliable, high-speed data transmission.

To communicate over an optical communications network using fiber optic technology, fiber optic components, such as fiber optic transceivers, are used to send and receive optical data. Generally, a fiber optic transceiver can include one or more optical subassemblies ("OSA") such as a transmit optical subassembly ("TOSA") for sending optical signals, and a receive optical subassembly ("ROSA") for receiving optical signals. More particularly, the TOSA has an electo-optical transducer that receives an electrical data signal and converts the electrical data signal into an optical data signal for transmission onto an optical network. The ROSA has an opto-electronic transducer that receives an optical data signal from the optical network and converts the received optical data signal to an electrical data signal for further use and/or processing. Both the ROSA and the TOSA include specific optical components for performing such functions.

In particular, a typical TOSA includes an optical transmitter such as a light emitting diode ("LED") or a laser diode located on a header for transmitting an optical signal to an optical fiber. A plastic barrel is typically used to align and couple the optical signal transmission from the optical transmitter with the end of a fiber optic cable for transmission of the optical signal to a fiber optic network. Similarly, a typical ROSA includes an optical receiver, such as a PIN photodiode or avalanche photodiode ("APD"), located on a header. A plastic barrel is typically used to align and couple the end of a fiber optic cable for transmission of the optical signal from a fiber optic network to the optical receiver. The ROSA and TOSA may be encased within a telecom grade package, such as, for example, ST, SOT, SC, FC, SMA, pigtail, LC, and TO-Can packages.

To identify optical components, markings are typically placed on the outside of fiber optic components. However, it is generally not easy to observe the markings on components, such as the TOSA and the ROSA, once they have been incorporated into a higher-level system or component. To do so may require disassembling, unduly testing, or destroying the higher-level system or component. For example, where a manufacturer makes the barrel portion of a TOSA incorporated into a transceiver, the barrel is typically surrounded by other specific components of the TOSA, other OSAs, and an outer housing, such that visual inspection of the barrel is difficult, if not impossible, without disassembling, unduly testing, or destroying the transceiver.

As a result, it has become difficult for dealers and consumers to determine the source of optical components. It has also become easy for counterfeiters to copy the appearance and markings of other manufacturers to pass off their optical components as those of well known manufacturers. Counterfeit optical components have become a particular concern in international markets where counterfeiters are able to mimic the look of well-known manufacturers and free ride on consumer good-will without investing in the costs to provide the same standard of quality.

Fiber optic components, such as ROSAs and TOSAs, contribute significantly to the overall performance and reliability of the end product, and therefore, customers may be willing to pay more for high quality optical components. Particular manufacturers may be known for their reputation of producing high quality optical components. In many instances customers are unable to verify whether parts they receive, or are considering purchasing, are actually made by a particular manufacturer.

In addition to the problems of verifying the source of optical components to prevent counterfeiting, it is also difficult for dealers and consumers to identify characteristics of optical components once they are incorporated into a higher-level assembly. For example, information related to the date that the optical component was manufactured, the location of the manufacture of the optical component, the model of the component, operational conditions of the optical component, as well as other characteristics of the specific optical component typically may not easily be obtained without disassembling, unduly testing, or destroying the higher-level system or component. In some instances a manufacturer, dealer, user, or customer may want to identify these, as well as many other, characteristics of the optical components in a non-invasive manner.

Therefore, what would be advantageous are methods, apparatuses, and systems for obtaining identification information about fiber optic components and optical assemblies in a non-invasive manner.

BRIEF SUMMARY OF THE INVENTION

The present invention relates to methods, apparatuses, and systems for obtaining identification information about fiber optic components and optical assemblies in a non-invasive manner. The present invention can include an OSA including an optical fiber interface, an active optical device optically aligned with the optical fiber interface for transfer of an optical signal, and an optical component including a fluorescent material for producing a fluorescent emission, the fluorescent emission having a predetermined spectral signature identifying one or more characteristics of the optical subassembly.

Also described are methods for manufacturing a fiber optic component. The method can include selecting a fluorescent material to emit a predetermined spectral signature, the predetermined spectral signature providing identification information describing the fiber optic component, and manufacturing the fiber optic component including manufacturing at least a portion of the fiber optic component to include the selected fluorescent material.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention.

Fluorescence is generally caused by absorption of energy in a particular spectrum thereby creating an excited state in a fluorescent material. After absorbing energy, electrons in the fluorescent material return to their original state and re-emit the energy as light, in a particular spectrum depending on the fluorescent material. The process of emission may be referred to as fluorescence.

Figure 1:
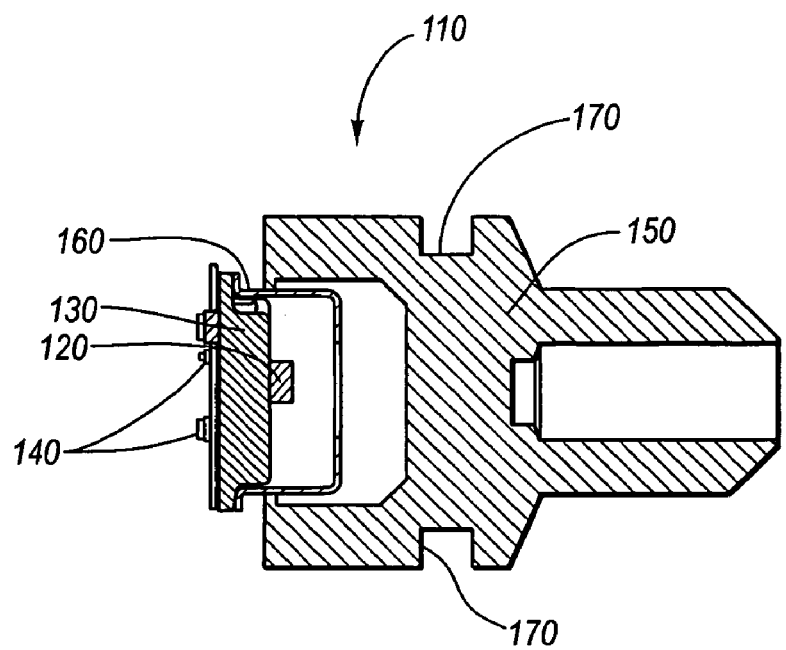
FIG. 1 illustrates an optical subassembly according to an example embodiment of the present invention.

Referring to FIG. 1, an optical subassembly 110 is shown according to an example embodiment of the present invention. The optical subassembly 110 can include an active optical device 120 located on a header 130 for transfer of an optical signal. In the case of a TOSA, the active optical device 120 can be an optical transmitter, such as a light emitting diode or a laser diode, located on the header 130. In the case of a ROSA, the active optical device 120 can be an optical receiver, such as a PIN photodiode or avalanche photodiode ("APD"), located on the header 130.

The header 130 can include a plurality of electrical leads 140, sometimes referred to as feed throughs, for providing power and data transmission between an OSA printed circuit board ("PCB") and the active optical device 120 mounted on the header 130. The active optical device can be encased within an optical package 160, such as, for example, a TO-Can package. The optical subassembly 110 can further include a barrel 150 for aligning and coupling an end of an optical cable with the active optical device 120 for transmission of an optical signal between an optical cable and the active optical device 120. The barrel 150 can include mechanical features 170 for mounting the OSA in a transceiver assembly.

According to an example embodiment of the present invention, at least a portion of the optical subassembly 110 can be formed of, or coated with, a fluorescent taggant dye. For example, as shown in FIG. 1, the barrel 150 of the optical subassembly 110 can be formed of, or coated with, with a fluorescent plastic dye. The dye can be added to the material that forms the barrel 150 during a molding process, and can be varied in concentration and spectrum of fluorescence. One example of the many dyes that may be used is Rhodamine 6G.

According to an example embodiment of the present invention, at least a portion of the optical subassembly 110 can contain, or be coated with taggant particles, such as quantum dots. For example, according to FIG. 1, the barrel 150 of the optical subassembly 110 can be formed, or coated, with quantum dots. Quantum dots are nanometer-scale semiconductor crystals with a core composed of semiconductor material, such as cadmium selenide (CdSe), cadmium sulfide (CdS), cadmium telluride (CdTe) and the like. The core may be coated by a shell material, such as ZnS.

The choice of material of the quantum dots core can be used to dictate the spectrum of emission. Further, the size of the crystals can be used to tune the emission wavelength within the spectrums available for each substance. Methods of manufacture of quantum dots, including their physical and optical properties, are well known. For example, see Xavier Michalet, Fabien Pinaud, Thilo D. Lacoste, Maxime Dahan, Marcel P. Bruchez, A. Paul Alivisatos, and Shimon Weiss, "Properties of Fluorescent Semiconductor Nanocrystals and their Application to Biological Labeling", Single Mol. 2 (2001) 4, 261-276; Warren C. W. Chan, Shuming Nie, "Quantum Dot Bioconjugates for Ultrasensitive Nonisotopic Detection", Science Vol. 281 (5385):2016 (1998); Marchel Burchez Jr., Mario Maronne, Peter Gin, Shimon Weiss, A. Paul Alivisatos, "Semiconductor nanocrystals as Fluorescent Biological Labels", 281 (5385):2013 (1998); the contents of these three documents are hereby incorporated by reference.

Different dye or taggant particles, such as quantum dots, having distinct spectral emissions can be used together to create a more complex spectral signature, similar to a spectral bar code. The spectral signature can be used to identify the optical subassembly 110 by producing particular colors and relative intensities between the colors. The relative intensity of the colors can be controlled by the relative proportions of taggant particles or dye added to the material. The spectral signature can indicate, for example, the manufacturer, the year of manufacture, the model, operational characteristics, or the manufacturing location of the optical subassembly 110 or a component including the optical subassembly 110. The spectral signature can be visually apparent to a human, or, may be analyzed by an optical filter or reader, such as a spectrometer. Any information that would be useful to the manufacturer, dealer, user, or customer can be encoded into the spectral signature by a combination of dyes having distinct spectral emissions resulting in a spectral barcode.

While virtually any fluorescent taggant dye or particle can be used, in some embodiments quantum dots have advantages over other fluorescent taggant dyes and particles. For example, Quantum dots are particularly well suited for use in optical components because they produce an emission with a narrow fluorescent spectrum, and the have the ability to reliably control intensity because of their long stable lifetime. The spectral signature is particularly distinguishable, for example, because of the different spectrums present and their relative intensities. Therefore, quantum dots allow for a large number of distinct spectral signatures such that additional information can be included in the spectral signature, potentially further describing the optical subassembly 110 or a component incorporating the optical subassembly 110.

The embodiment shown in FIG. 1 has been described where the barrel 150 of the optical subassembly 110 can be formed of, or coated with a fluorescent plastic material, such as a taggant dye or taggant particle. The specific arrangement of the embodiment shown in FIG. 1 is for explanation only. It would be apparent to one skilled in the art, after having reviewed this description, that other configurations of materials and taggant particles may be used. For example, the present invention, includes embodiments where any portion of a component of any optical device, assembly, package, or component incorporates a taggant material for providing identification information. For example, a header, cap, lens, substrate, housing, or virtually any portion of an optical device, assembly, package or component can be made, or coated, with fluorescent material to provide a spectral signature in view of the teachings of the present invention.

Referring still to FIG. 1, the barrel 150 can include an outer surface shaped and configured for receiving an optic interface of any type or configuration. For example, the optical subassembly can include an outer surface shaped and configured to receive a SC or LC fiber optic connector for optical coupling of the optical subassembly 110 to a fiber optic cable.

The optical subassembly 110 can include any number of components and configurations, and the embodiment shown in FIG. 1 is merely illustrative of an example embodiment of the present invention. For example, referring now to FIG. 2, a TOSA is illustrated according to an example embodiment of the present invention. The TOSA can include a TO-Can package 260 containing a vertical cavity surface emitting laser ("VCSEL") 220 located above a laser driver 235. The laser driver 235 can include laser driver circuitry and can be located above a header 230. A monitor photodiode 225 can be located next to the VCSEL 220 and above the laser driver 235 for providing feedback related to the output of the VCSEL 220. The header 230 can include a plurality of feed throughs 240 for providing an electrical current to the components located above the header 230. According to one embodiment, the laser driver 235, can be a modulation laser driver that modulates a bias current source supplied to the VCSEL 220 from external to the optical assembly 110 via the feed throughs 240. The VCSEL 220, monitor photodiode 225, and the laser driver 235 can be discrete components, or may be made from the same epitaxial design.

The optical subassembly 210 can further include a plastic barrel 250 for aligning and coupling an end of an optical cable with the VCSEL 220. The plastic barrel 250 can includes mechanical features 270 for mounting the TOSA in a transceiver assembly and an optical lens surface 280 for focusing an optical transmission from the VCSEL 220. The mechanical features 270 are typically not available outside of a transmitter and a fiber ferrule and the barrel 150 are all that is necessary to align a fiber to the TOSA 210. According to this embodiment of the present invention, at least a portion of the barrel 250, or any other component, can include a fluorescent taggant, such as a fluorescent dye or quantum dots, for producing a fluorescent emission having a distinct spectral signature.

Figure 3:
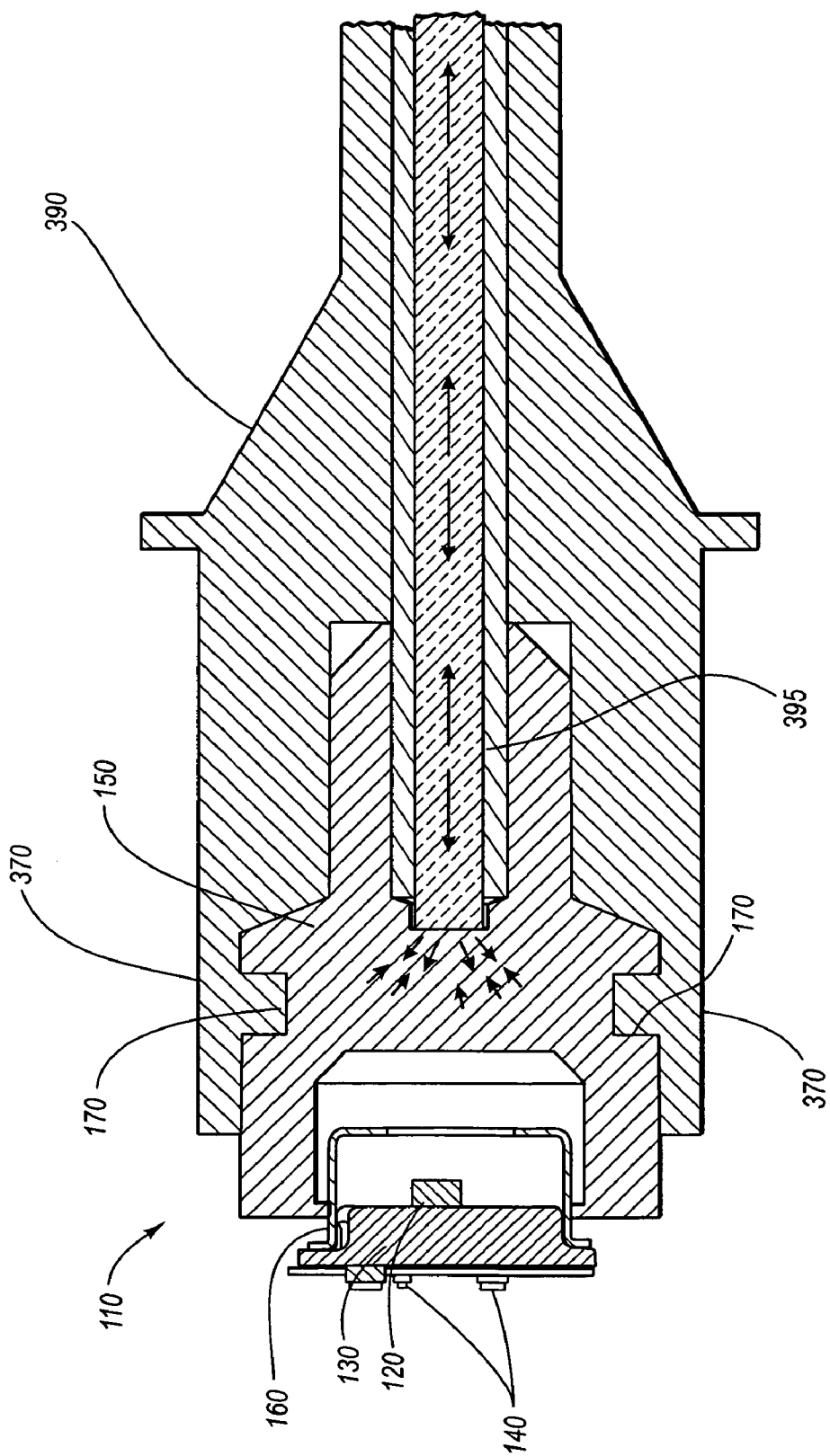
FIG. 3 illustrates an optical subassembly connected to a fiber optic interface according to an example embodiment of the present invention.

Referring now to FIG. 3, an optical subassembly 110 (such as that shown in FIG. 1) including fluorescent material is shown connected to a fiber optic interface 390 for providing illumination and inducing fluorescence in the optical subassembly 110 according to an example embodiment of the present invention. The fiber optic interface 390 can include an optical fiber 395 for providing a light source to illuminate the barrel 150 made of fluorescent material, and also for receiving the fluorescent emission from the fluorescent material in the barrel 150. The fiber optic interface 390 can include locating protrusions 370 for engaging the mechanical features 170 of the optical subassembly 110 in a snap-fit engagement. However, the locating protrusions 270 and mechanical features 170 are not required for aligning the fiber 395 with the optical subassembly 110 and the mechanical features 170 may not be accessible outside of a transmitter including the optical subassembly 110. The optical subassembly 110 receives the optical fiber 395 within the barrel 150 at a location for inducing and receiving fluorescence.

Not all light is capable of causing fluorescent dyes and taggant particles, such as quantum dots, to transition to a fluorescent state. The transitions can occur at specific energies and only light of certain wavelengths will be absorbed and emitted. Other wavelengths may not be absorbed and will pass through the barrel 150 without inducing fluorescence.

The dye and taggant particles can be transmissive to the wavelength of an optical transmitter, such as a VCSEL (850 nm), but absorb ultra violet ("UV") and blue wavelength light causing fluorescence. Therefore, the light transmitted from optical fiber 395 for illumination in FIG. 2 can be at a wavelength intended to induce fluorescence in the fluorescent material. However, in normal operation where optical communication signals are transferred using the optical subassembly 110, for example to transfer data, the light produced by an optical transmitter may not be of a wavelength that induces fluorescence.

Figure 2:
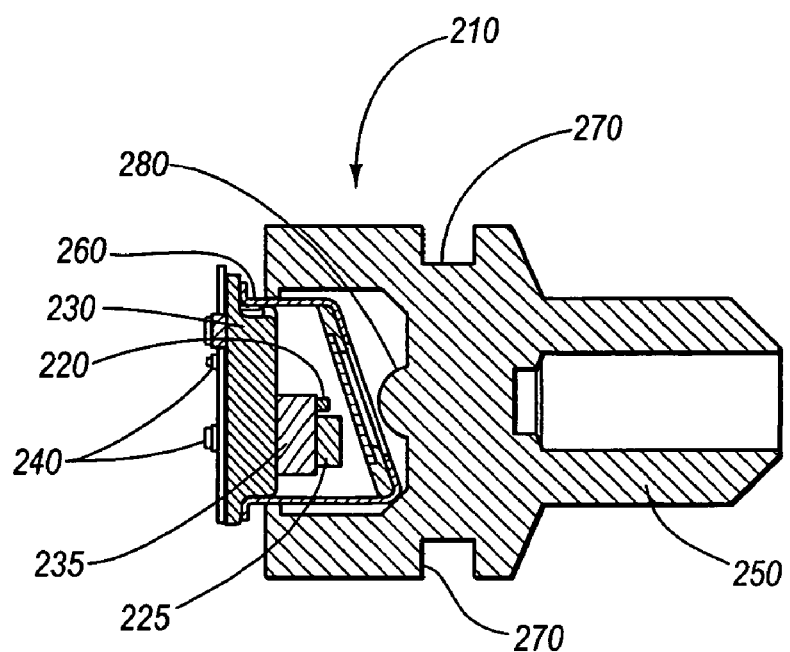
FIG. 2 illustrates an optical subassembly according to an example embodiment of the present invention.

In some embodiments, however, it may be beneficial to use an optical transmitter, such as an LED, to transmit a particular wavelength. The particular wavelength can excite the fluorescent material and induce fluorescence, thereby internally illuminating the fluorescent material rather than providing the illumination from the optical fiber 395 as shown in FIG. 2. In these embodiments, the active optical device 120 may include an ultra violet light emitting diode (UV LED) to induce fluorescence in the fluorescent material.

Figure 4:
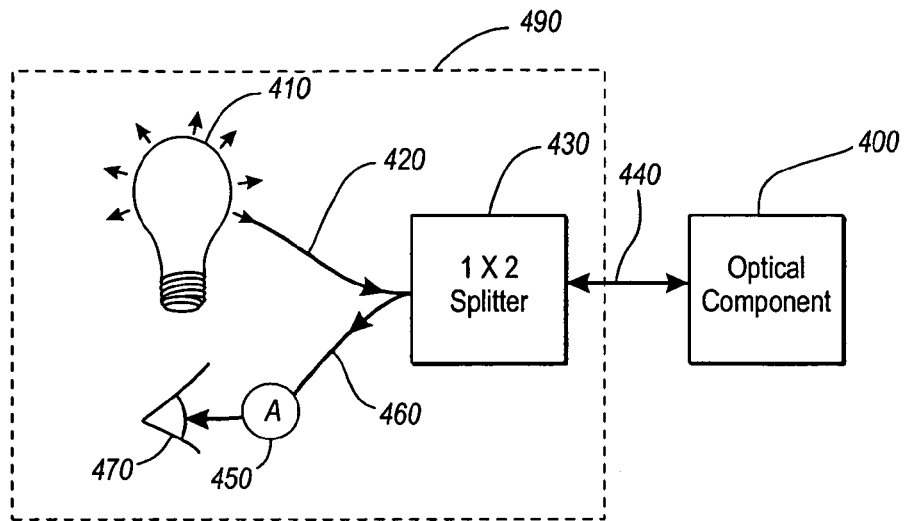
FIG. 4 illustrates a test device for inducing, receiving, and analyzing a fluorescent emission according to an example embodiment of the present invention.

Referring now to FIG. 4, an example embodiment of a test device 490 for receiving a fluorescent emission (e.g. having a spectral signature) from an optical component 400 is shown according to an example embodiment of the present invention. The test device 490 can include an illumination source 410 for providing illumination to the optical component 400 to induce a fluorescent emission. The illumination can be transmitted from the illumination source 410 by a first optical fiber 420 to a 1×2 optical splitter 430 that is coupled to the optical component 400 by a second optical fiber and interface 440.

The optical component 400 can receive the illumination from the illumination source 410, which induces a fluorescent emission in the optical component 400. The fluorescent emission can be received by the second optical fiber and interface 440 and transmitted to the optical splitter 430. The optical splitter 430 can receive the fluorescent emission from the second optical fiber and interface 440 and direct the fluorescent emission to a spectral filter 450 using a third optical fiber 460.

The spectral filter 450 can include, for example, a long-pass filter, a band pass filter, or a spectrometer for separating out the spectral signature of the fluorescent emission. For example, the spectral filter 450, can be a long-pass filter that allows wavelengths above a certain spectrum to pass, or a band-pass filter that is tailored about the specific spectrum of light emitted by the taggants.

An output, such as the fluorescent color of the taggant (e.g. a spectral signature), can be viewed by a user 470. Based on the color or spectral signature viewed by the user 470, the user can identify the optical component 400 or a subcomponent of the component 400, or characteristics of the optical component 400 or a subcomponent of the optical component 400. For example, the user can identify the manufacturer of the optical component 400, the date that the optical component 400 was manufactured, the location of manufacture of the optical component 400, the model of the optical component 400, operational conditions of the optical component 400, and/or other characteristics of the optical component 400.

Figure 5:
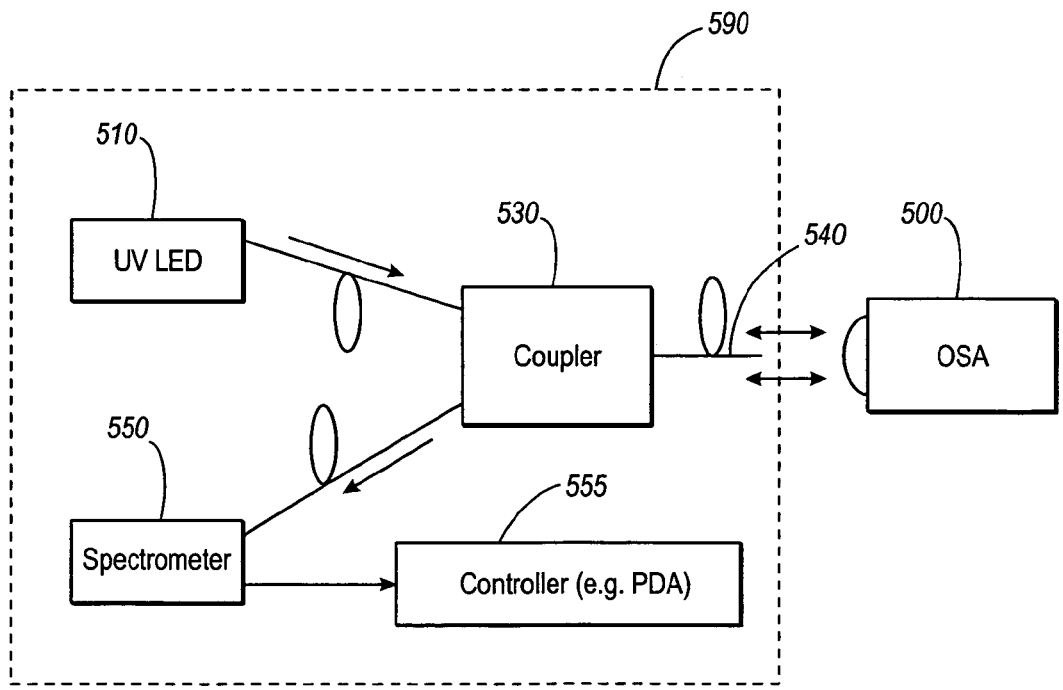
FIG. 5 illustrates a test device for inducing, receiving, and analyzing a fluorescent emission according to an example embodiment of the present invention.

Referring now to FIG. 5, a more particular example embodiment of a test device 590 for receiving a fluorescent emission having a specific spectral signature is illustrated. The test device 590 can receive a fluorescent emission from an OSA 500 (such as, for example, the OSA 110 illustrated in FIG. 1). The test device 590 can include an UV LED 510 for providing illumination to the fluorescent material of the OSA 500. The illumination can be transmitted to a coupler 530, which can be coupled to the OSA 500 by a fiber optic interface 540 (such as the fiber optic interface 390 shown in FIG. 3).

Referring still to FIG. 5, the fluorescent taggant material in the OSA 500 can be illuminated inducing a fluorescent emission. The fluorescent emission can include a spectral signature indicating identification information related to the specific OSA 500. The fluorescent emission can be received by the coupler 530 and can be directed to a spectrometer 550 for spectral analysis. The spectrometer 550 can be any optical reader for analyzing the spectral signature of the fluorescent emission including its relative colors and intensities.

A controller 555, such as a computer, data processing machine, or personal digital assistant ("PDA"), can be connected to the spectrometer 550 to receive a result of the spectral analysis. The controller 555 can include executable logic (e.g. computer-executable instructions) for comparing the result of the spectral analysis to stored data. The stored data can be data related to potential spectral signatures that would indicate, for example, the manufacturer of the OSA 500, the date that the OSA 500 was manufactured, the location of manufacture of the OSA 500, the model of the OSA 500, operational conditions of the OSA 500, and/or other characteristics of the OSA 500, a component of the OSA 500, or an optical assembly, such as a transceiver, incorporating the OSA 500. The controller 555 can output a result of the comparison to a user by outputting the comparison result to a graphical user interface ("GUI"), display, data file, or printer, for example.

In some instances, however, an illumination source external to the OSA 500, such as the UV LED 510, may not be necessary. For example, when the OSA 500 includes an optical transmitter, such as a UV LED, that excites the fluorescent material and induces fluorescence thereby internally illuminating the fluorescent material, an external source of illumination, such as the UV LED 510, may not be needed.

Figure 6:
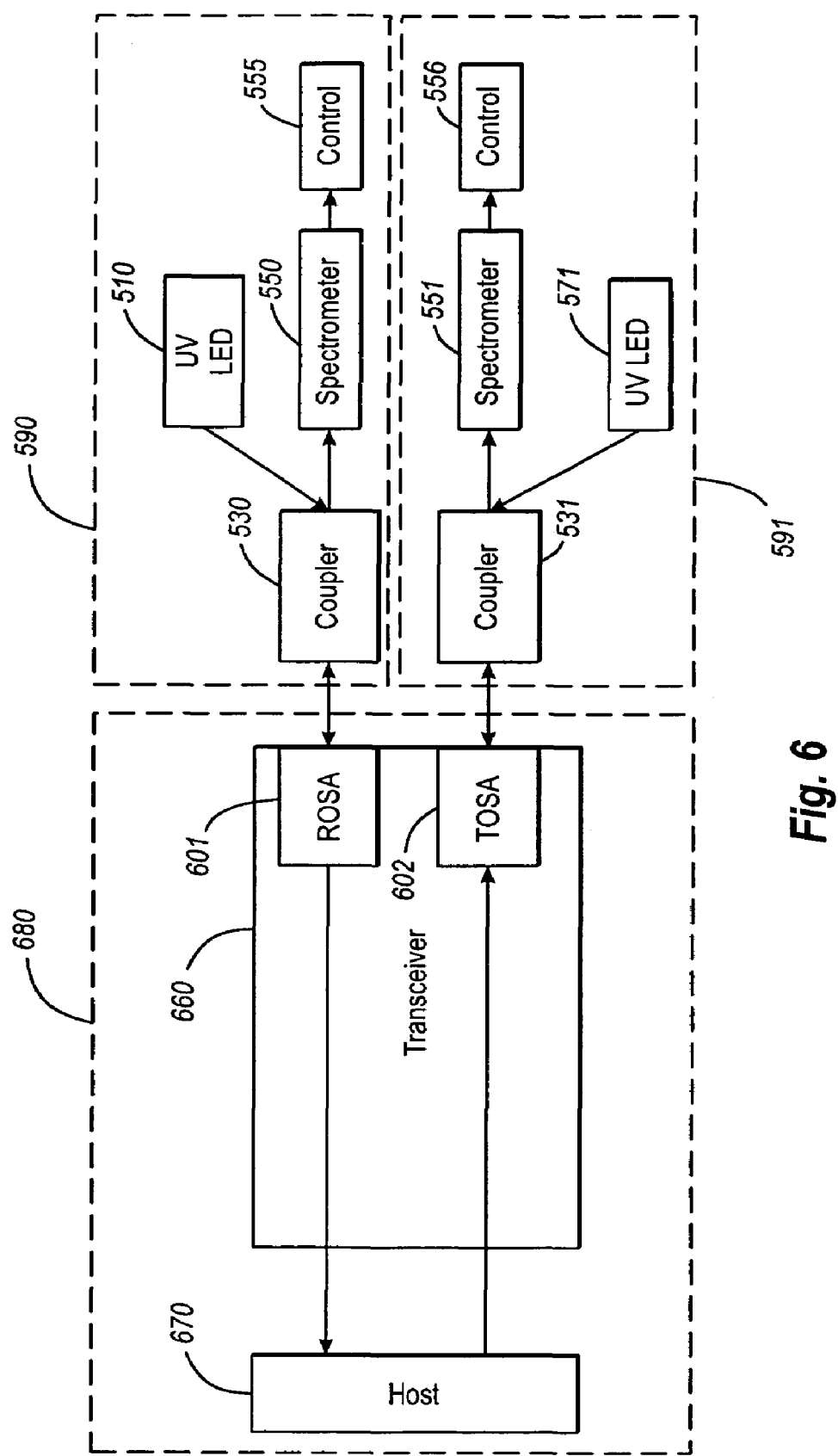
FIG. 6 illustrates two test devices coupled to a transceiver—host communication node for data communication with a communication network according to an example embodiment of the present invention.

As described above, OSAs may be part of a higher-level system, such as a transceiver. Referring now to FIG. 6, two test devices 590 and 591 can be coupled to a communication node 680, which includes a transceiver 660 and a host 670. The transceiver 660 can include a ROSA 601 for receiving an optical signal, and a TOSA 602 for transmitting an optical signal. According to the example embodiment shown in FIG. 6, both the TOSA 602 and the ROSA 601 can include fluorescent material for emitting a spectral signature providing identification, or other information about their particular OSA, a component of the OSA, or even identification information about the particular transceiver 660 or communication node 680.

Test devices 590 and 591 are coupled to the optical subassemblies, one to the TOSA 602 and one to the ROSA 601. Each test device 590 and 591 can include an UV LED 510 and 511, a coupler 530 and 531, a spectrometer 550 and 551, and a controller 555 and 556 (e.g. similar to that discussed above, for example when referring to FIG. 5). According to the embodiment shown in FIG. 6, the OSAs containing the fluorescent material can be identified using the test devices 590 and 591 in a non-invasive manner. The identification information can also be output to a user using the test devices 590 and 591 in a simple and efficient manner.

While a transceiver 660 is shown in FIG. 6 including both a ROSA 601 and a TOSA 602 having florescent material, the transceiver 660 is merely illustrative of one example of a higher level assembly incorporating examples of optical components having fluorescent taggant material for emitting a spectral signature providing identification, or other, information. According to example embodiments of the present invention, the transceiver 660 can be any higher-level system or component incorporating any number or type of fiber optic components. Likewise, the ROSA 601 and TOSA 602 can be any type of fiber optic component where obtaining identification using a fluorescent taggant would be advantageous.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical subassembly ("OSA") comprising:
   an optical fiber interface;
   an active optical device optically aligned with the optical fiber interface for transfer of an optical signal; and
   an optical component including a fluorescent material for producing a fluorescent emission, wherein laser light from the active optical device does not induce the fluorescent emission and wherein the fluorescent emission (i) is induced by light from a second light source and (ii) has a predetermined spectral signature identifying one or more characteristics of the optical subassembly.

2. The OSA according to claim 1, further comprising:
   a header located under the active optical device;
   a barrel for aligning and coupling an end of an optical cable with the active optical device;
   electrical leads coupled to the active optical device; and
   an optical package at least partially received within the barrel.

3. The OSA according to claim 2 wherein the optical package is a TO-Can optical package.

4. The OSA according to claim 1, wherein the optical component is at least one of a barrel for aligning and coupling the active optical device to the end of a fiber optic cable and a header located under the active optical device, wherein the optical component is at least partially made of the fluorescent material.

5. The OSA according to claim 4, wherein the optical component is at least partially made of the fluorescent material by at least one of coating at least a portion of the optical component with fluorescent material and molding at least a portion of the optical component from fluorescent material.

6. The OSA according to claim 1, wherein the predetermined spectral signature includes at least two different spectrums of light.

7. The OSA according to claim 6, wherein the at least two different spectrums of light are emitted at different intensities of light.

8. The OSA according to claim 1, wherein the fluorescent material includes at least one of a fluorescent dye or quantum dots.

9. The OSA according to claim 1, wherein the fluorescent material includes at least two different types of fluorescent material, each type of fluorescent material selected to produce a fluorescent emission at a different spectrum of light.

10. The OSA according to claim 9, wherein the fluorescent material includes at least two different types of fluorescent material of different proportions to create different fluorescent intensities at different spectrums of light.

11. The OSA according to claim 1, wherein the fluorescent material includes particles made of at least one of cadmium sulfide (CdS), cadmium selenide (CdSe), and cadmium telluride (CdTe).

12. The OSA according to claim 1, wherein the fluorescent material is a plastic fluorescent material.

13. The OSA according to claim 1, wherein the fluorescent material is configured to emit a spectral signature identifying at least one of:
   the manufacturer of the optical component;
   the location of the manufacture of the optical component;
   the year of manufacture of the optical component;
   the model of the optical component;
   an operational characteristic of the optical component;
   the manufacturer of the OSA;
   the location of the manufacture of the OSA;
   the year of manufacture of the OSA;
   the model of the OSA;
   operational characteristics of the OSA
   the manufacturer of the OSA;
   the location of the manufacture of the OSA;
   the year of manufacture of the OSA;
   the model of the OSA; and
   an operational characteristic of the OSA.

14. The OSA according to claim 1, wherein the OSA is either a transmit optical subassembly ("TOSA") including a vertical cavity surface emitting laser (VCSEL) or a receive optical subassembly ("ROSA") including a photodiode.

15. An optical assembly comprising the optical subassembly of claim 1.

16. A transceiver comprising the optical subassembly of claim 1.

17. The optical subassembly of claim 1, wherein the second light source comprises an ultra violet light emitting diode that is mounted along side of the active optical device.

* * * * *

UNITED STATES PATENT AND TRADEMARK OFFICE
CERTIFICATE OF CORRECTION

PATENT NO. : 7,281,861 B2  Page 1 of 1
APPLICATION NO. : 11/085434
DATED : October 16, 2007
INVENTOR(S) : Tatum et al.

It is certified that error appears in the above-identified patent and that said Letters Patent is hereby corrected as shown below:

Column 3
Line 47, omit ","

Column 4
Line 11, omit "with"

Column 5
Line 1, change "the" to --they--
Line 13, after "with" insert --,--
Line 19, omit ","
Line 50, omit ","
Line 60, change "includes" to --include--

Column 6
Line 8, after "110" insert --,--
Line 15, change "270" to --370--
Line 35, change "FIG. 2" to --FIG. 3--

Column 7
Line 7, after "450" omit ","

Column 8
Line 66, after "2" insert --,--

Signed and Sealed this

Thirty-first Day of August, 2010

David J. Kappos
*Director of the United States Patent and Trademark Office*